US009720123B2

(12) United States Patent
Mackay et al.

(10) Patent No.: US 9,720,123 B2
(45) Date of Patent: Aug. 1, 2017

(54) ELECTRODE ASSEMBLY FOR MARINE ELECTROMAGNETIC GEOPHYSICAL SURVEY SOURCES

(75) Inventors: James Ewan Mackay, Edinburgh (GB); Oliver Colin Peppe, West Linton (GB); Prawin K. Bhadani, Dundee (GB); Ulf Peter Lindqvist, Segeltorp (SE); Richard Samuel Bailie, Fife (GB)

(73) Assignee: PGS Geophysical AS, Olso (NO)

( * ) Notice: Subject to any disclaimer, the term of this patent is extended or adjusted under 35 U.S.C. 154(b) by 1053 days.

(21) Appl. No.: 13/494,883

(22) Filed: Jun. 12, 2012

(65) Prior Publication Data

US 2013/0119996 A1    May 16, 2013

Related U.S. Application Data

(60) Provisional application No. 61/558,918, filed on Nov. 11, 2011.

(51) Int. Cl.
*G01V 3/12* (2006.01)
*G01V 3/08* (2006.01)
*G01V 1/20* (2006.01)

(52) U.S. Cl.
CPC ............. *G01V 3/083* (2013.01); *G01V 1/201* (2013.01); *G01V 2003/084* (2013.01)

(58) Field of Classification Search
CPC ... G01V 3/083; G01V 2003/084; G01V 1/201
See application file for complete search history.

(56) References Cited

U.S. PATENT DOCUMENTS

| 2,838,731 | A | * | 6/1958 | Cruzan et al. | 324/366 |
| 4,295,096 | A | * | 10/1981 | Sternberg et al. | 324/357 |
| 4,298,840 | A | * | 11/1981 | Bischoff et al. | 324/365 |
| 4,617,518 | A |  | 10/1986 | Srnka |  |
| 4,641,288 | A | * | 2/1987 | McGowan | G01V 1/201 |
|  |  |  |  |  | 174/101.5 |
| 6,091,670 | A | * | 7/2000 | Oliver | G01V 1/201 |
|  |  |  |  |  | 367/20 |
| 6,426,464 | B1 | * | 7/2002 | Spellman | H01Q 1/04 |
|  |  |  |  |  | 174/101.5 |
| 6,674,286 | B2 | * | 1/2004 | Lagmanson | 324/362 |

(Continued)

FOREIGN PATENT DOCUMENTS

| FR | 2863056 A1 | 6/2005 |
| GB | 975479 A | * 11/1964 |

(Continued)

OTHER PUBLICATIONS

"Dupont Delrin Acetal Resin Product and Property Guide", The DuPont Company, H76836-1, Nov. 2006.

(Continued)

*Primary Examiner* — Son Le
*Assistant Examiner* — Adam Clarke

(57) ABSTRACT

Disclosed are methods and systems that include a multiple-tube electrode assembly. An embodiment discloses an electrode assembly, comprising: a carrier body comprising an elongated support; and electrically conducting surfaces longitudinally spaced along the carrier body, wherein the electrically conducting surfaces are electrically coupled in parallel.

30 Claims, 8 Drawing Sheets

(56) References Cited

U.S. PATENT DOCUMENTS

| | | | |
|---|---|---|---|
| 7,180,828 B1 * | 2/2007 | Sommer | G01V 1/201 367/153 |
| 7,411,399 B2 | 8/2008 | Reddig et al. | |
| 7,446,535 B1 | 11/2008 | Tenghamn et al. | |
| 7,642,784 B2 | 1/2010 | Reddig et al. | |
| 7,928,732 B2 * | 4/2011 | Nichols | 324/348 |
| 2007/0229083 A1 | 10/2007 | Tenghamn et al. | |
| 2009/0010101 A1 * | 1/2009 | Lunde | G01V 1/201 367/20 |
| 2009/0184715 A1 * | 7/2009 | Summerfield et al. | 324/334 |
| 2010/0231224 A1 | 9/2010 | Lindqvist | |
| 2011/0058449 A1 * | 3/2011 | Stenzel | G01V 1/201 367/20 |
| 2011/0255366 A1 | 10/2011 | Karlsen et al. | |
| 2012/0146650 A1 * | 6/2012 | Combee | 324/354 |

FOREIGN PATENT DOCUMENTS

| | | | |
|---|---|---|---|
| GB | 2488658 | A | 9/2012 |
| WO | 2007136451 | A2 | 11/2007 |
| WO | 2007136451 | A3 | 11/2007 |
| WO | 2012036559 | A1 | 3/2012 |

OTHER PUBLICATIONS

European Search Report mailed on Mar. 10, 2015, for application No. 12191466.7, 7 pages.

* cited by examiner

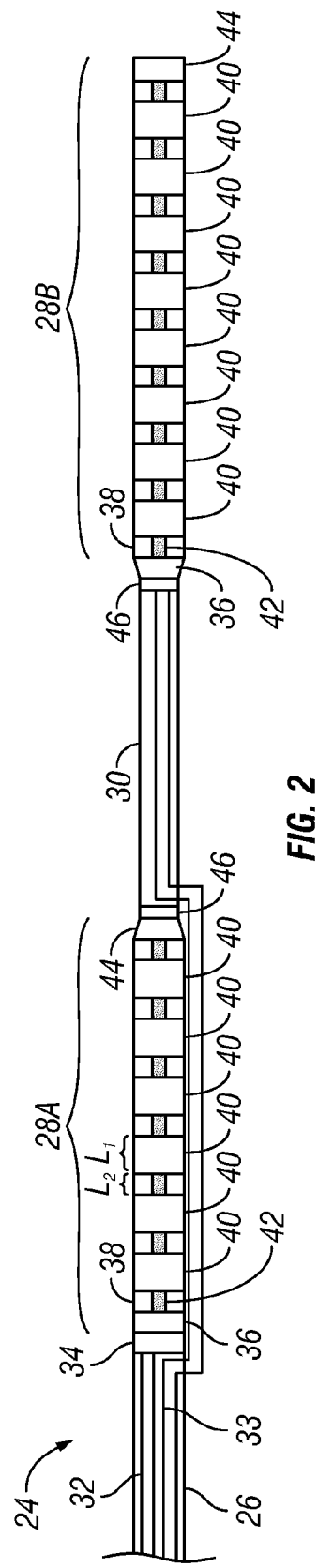
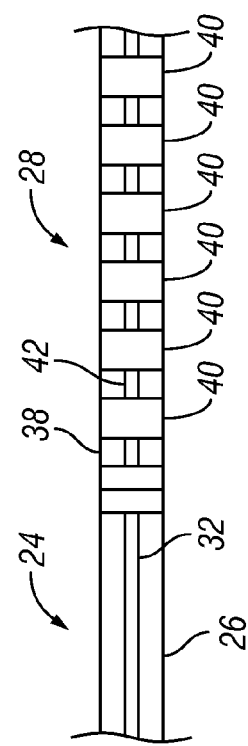

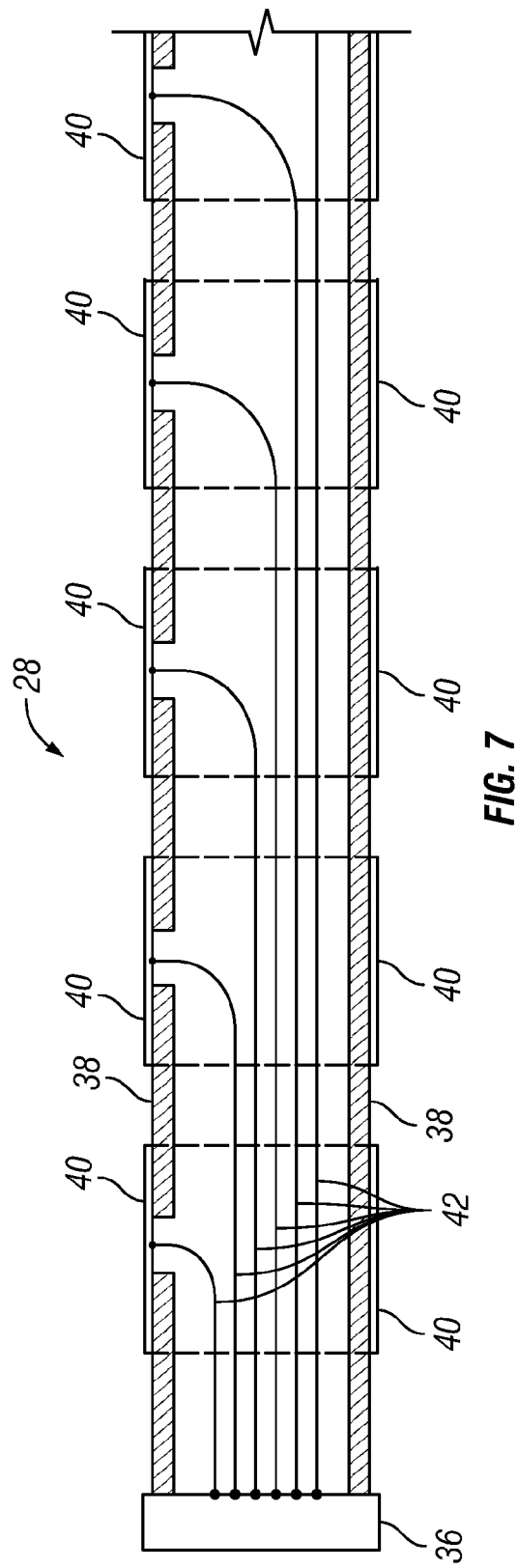

US 9,720,123 B2

ELECTRODE ASSEMBLY FOR MARINE ELECTROMAGNETIC GEOPHYSICAL SURVEY SOURCES

CROSS-REFERENCE TO RELATED APPLICATIONS

The present application claims the benefit of U.S. Provisional Application No. 61/558,918, filed Nov. 11, 2011, entitled "Electromagnetic Geophysical Survey Source," the entire disclosure of which is incorporated herein by reference.

BACKGROUND

The present invention relates generally to the field of marine electromagnetic geophysical surveying. More particularly, in one or more embodiments, this invention relates to an electrode assembly for marine electromagnetic geophysical survey sources and associated methods of use, the electrode assembly comprising a carrier body and electrically conducting surfaces longitudinally spaced along the carrier body.

Marine electromagnetic geophysical surveying is used, among other purposes, to infer spatial distribution of electrical conductivity of rock formations below the bottom of a body of water, such as a lake or ocean. The spatial distribution of conductivity is used to assist in determining the presence of hydrocarbon-bearing rock formations in the subsurface, potentially resulting in cost saving by better targeted drilling operations. One type of such surveying is known as "controlled source" electromagnetic surveying ("CSEM"), which generally includes inducing a time-varying electromagnetic field in the subsurface formations and measuring one or more parameters related to a response of the subsurface rock formations to the induced electromagnetic field.

Devices for inducing such electromagnetic fields are generally termed to as electromagnetic "sources" or "transmitters" and include, among other devices, spaced apart electrodes or wire coils disposed along or at the end of a cable. The cable is typically towed by a vessel in the body of water. Time-varying electric current is imparted across the electrodes to induce a time-varying electric field in the water and subsequently in the subsurface rock formations. In some instances, the electrodes may be large, inflexible structures, such as metal cylinders or tubes. Such cylinders or tubes may be suspended at a selected depth in the water by the use of flotation devices, such as buoys. Drawbacks to these types of electrodes include difficulties in handling as these, larger, inflexible structures can be difficult to deploy and may exert undesirable stress on the cables, connectors, and flotation devices. Further drawbacks to these types of electrodes include the high power requirements that may be needed to generate the high levels of current that may be imparted across the electrodes, in some instances.

BRIEF DESCRIPTION OF THE DRAWINGS

These drawings illustrate certain aspects of some of the embodiments of the present invention and should not be used to limit or define the invention.

FIG. 2 illustrates an example embodiment of a source cable comprising two electrode assemblies that each comprise a carrier body and electrically conducting surfaces longitudinally spaced along the carrier body.

FIG. 3 illustrates an example embodiment of a source cable comprising one electrode assembly that comprises a carrier body and electrically conducting surfaces longitudinally spaced along the carrier body.

FIG. 7 illustrates parallel connection of electrical conductors to the electrically conducting surfaces of an electrode assembly in accordance with example embodiments of the present invention.

DETAILED DESCRIPTION

Figure 1:
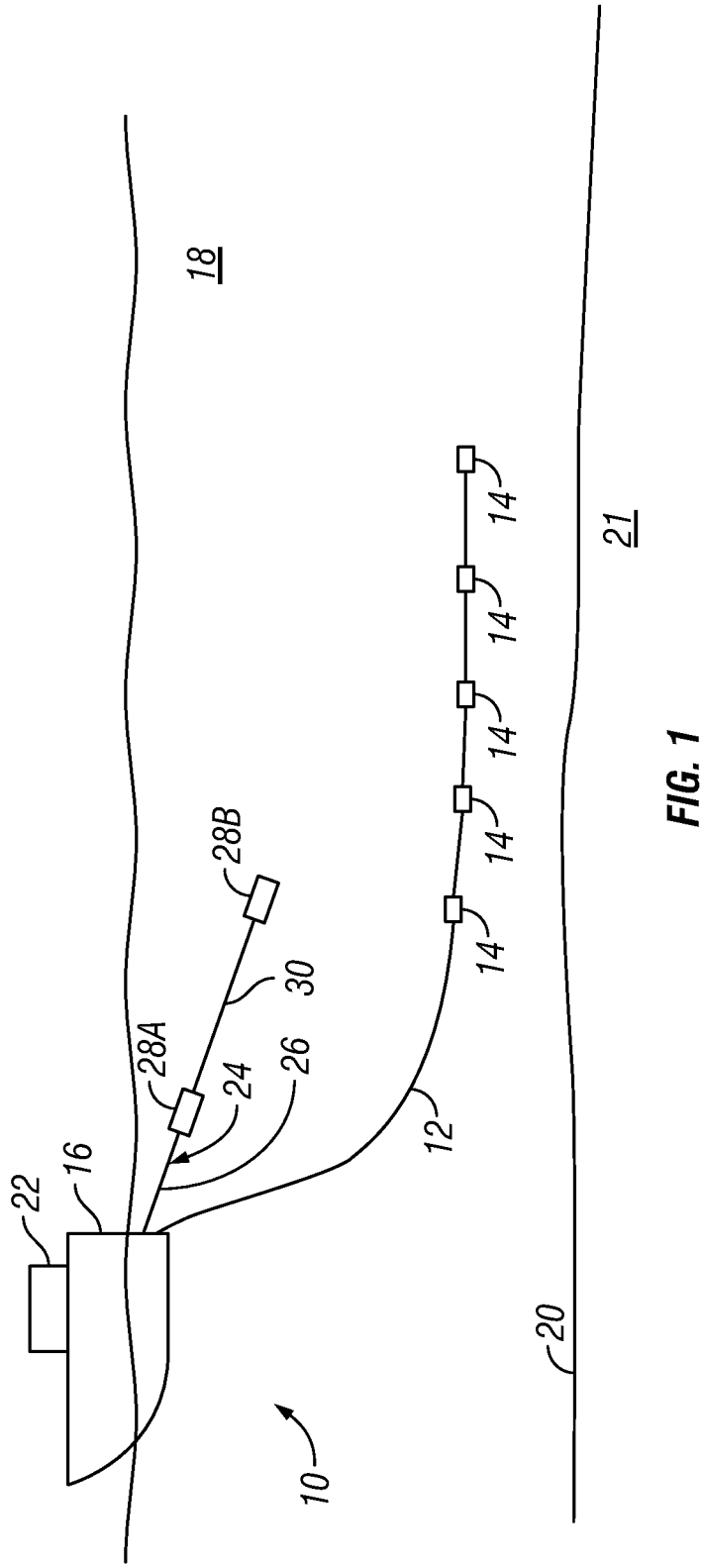
FIG. 1 illustrates an example embodiment of a marine electromagnetic survey system.

FIG. 1 illustrates a marine electromagnetic survey system 10 in accordance with embodiments of the present invention. As illustrated, the marine electromagnetic survey system 10 may include a sensor cable 12 having thereon at longitudinally spaced apart positions a plurality of sensors 14. The sensor cable is shown being towed by a survey vessel 16 moving on the surface of a body of water 18, such as a lake or ocean. The sensor cable 12 may alternatively be deployed on or near the water bottom 20 or towed by another vessel (not shown). As another alternative, one or more additional sensor cables (not shown) may be towed behind the survey vessel 16 towed behind another vessel (not Shown), or deployed at or near the water bottom 20. The invention may also be used with sensor nodes (not shown), for example, static nodes disposed on or near the water bottom 20. The type(s) and configurations(s) of the sensors 14 are not intended to limit the scope of the invention. Without limitation, the sensors 14 may be used, for example, to measure the electromagnetic response of formations 21 below the water bottom 20 to electromagnetic field(s) imparted by one or more electromagnetic sources, as discussed below. The sensors 14 may measure one or more various electric field properties, such as voltage, magnetic field amplitude, and/or magnetic field gradient.

The survey vessel 16 may include thereon equipment, shown generally at 22 and referred to for convenience as a "recording system," that may include devices (none shown separately) for navigation, for energizing one or more electromagnetic sources for imparting an electromagnetic field in the formations 21 below the water bottom 20, and/or for recording and processing signals generated by the various sensors 14.

The marine electromagnetic survey system 10 shown in FIG. 1 further may include an electromagnetic source cable 24 for towing one or more devices for inducing an electromagnetic field in the formations 21 below the water bottom 20. In some embodiments, the sensor cable 12 may be longer than the source cable 24. For example, the sensor cable 12 may have a length that is at least 8 times longer than the source cable 24. In one embodiment, the sensor cable 12 may have a length in a range of from about 4 kilometers to about 8 kilometers while the source cable 24 may have length in a range of from about 0.5 kilometers to about 2 kilometers. In a particular embodiment, the source cable 24 may have a length of about 1 kilometer.

The source cable 24 may comprise a tow cable 26 coupled (directly or indirectly) to the survey vessel 16 and may include insulated conductors, optical fibers, and a strength member (not shown separately) to, among things, conduct electrical and/or optical signals, conduct electric power, and transmit axial towing force from the survey vessel 16. In the illustrated embodiment, the tow cable 26 is coupled to a pair of electromagnetic source electrodes, such as first and second electrode assemblies 28A, 28B. In some embodiments, the distance between the first and second electrode assemblies 28A, 28B may be greater than the distance from the survey vessel 16 to the first electrode assembly 28A. For example, the distance between the first and second electrode assemblies 28A, 28B may be in a range of from about 400 meters to about 800 meters while the distance from the survey vessel 16 to the first electrode assembly 28A may be in a range of about 50 meters to about 150 meters. In one embodiment, the distance from the survey vessel 16 to the first electrode assembly 28A may be about 100 meters. As illustrated, the first and second electrode assemblies 28A, 28B may be at different depths in the body of water 18 with respect to one another. The aft end (with respect to the towing direction) of the tow cable 26 may be coupled to a forward end (with respect to the towing direction) of the first electrode assembly 28A with the first electrode assembly 28A electrically coupled to the tow cable 26. The aft end of the first electrode assembly 28A may be coupled to a spacer cable 30. The aft end of the spacer cable 30 may be coupled to a forward end of the second electrode assembly 28B with the second electrode assembly 28B electrically coupled to the tow cable 26. In some embodiments, the second electrode assembly 28B can be electrically independent from the first electrode assembly 28A. The electrode assemblies 28A, 28B may be activated at selected times by an electrical current source (not shown separately) so as to induce an electromagnetic field in the formations 21 below the water bottom 20. The electrical current source may be located, for example, in the recording system 22, on the source cable 24, or in other equipment (not shown). The current may be, for example, switched direct current (e.g., switching current on, switching current off, reversing current polarity, or sequential switching such as a pseudorandom binary sequence). The configuration shown in FIG. 1 may induce an electric field in the subsurface formations 21 when the electrode assemblies 28A, 28B are energized by the electric current. The type of current used to energize the electrode assemblies 28A, 28B is not limited to the foregoing as the invention is applicable to the use of any desired current waveform. The invention is also applicable to both frequency domain (continuous source) and transient induced electromagnetic fields.

Referring now to FIG. 2, the electromagnetic source cable 24 is illustrated in more detail in accordance with embodiments of the present invention. As previously discussed, the source cable 24 may include a tow cable 26 that may include, for example, one or more electrical conductors (e.g., first electrical conductor 32, second electrical conductor 33) therein and suitable axial load carrying components (e.g., one or more strength members—not shown) to enable transmission of towing force from the survey vessel (e.g., survey vessel 16 on FIG. 1) to the remaining components on the source cable 24. In some embodiments, the tow cable 26 may be a single cable with two electrical cores, e.g., first electrical conductor 32 and second electrical conductor 33. In the illustrated embodiment, the tow cable 26 is terminated at its aft end by a termination plate 34 that is configured to make suitable electrical and mechanical connections to the first electrode assembly 28A.

As illustrated, the forward end of the first electrode assembly 28A may be coupled to the aft end of the tow cable 26. A forward termination 36 on the first electrode assembly 28A may make mechanical and electrical connection to the termination plate 34 at the aft end of the tow cable 26. The first electrode assembly 28A may have a length, for example, in a range of about 10 meters to about 100 meters. In alternative embodiments, the first electrode assembly 28A may have a length in a range of about 12 meters to about 20 meters. Lengths outside this range may also be suitable in some applications. For example, if surveying in a shallow body of water it may be desirable to use a shorter electrode assembly 28A. By way of further example, a longer electrode assembly 28A may be used where a stronger source strength may be desired. The first electrode assembly 28A may have a diameter, for example, in a range of about 0.1 meters to about 0.3 meters or, in alternative embodiments, of about 0.1 meters to about 0.2 meters. A long, thin electrode assembly 28A, for example, with a long length with respect to the diameter may be desired in accordance with certain embodiments, to provide a reduced contact resistance to water, as compared to other electrodes with the same surface area. Likewise, it is currently believed that a smaller diameter electrode assembly 28A will provide a lower drag profile when towed, thereby improving towing performance.

The forward termination 36 of the first electrode assembly 28A may be coupled to a carrier body 38 on which electrically conducting surfaces 40 are longitudinally spaced. As illustrated, the carrier body 38 may be in the form of an elongated support, such as an elongated tube, in accordance with present embodiments. The elongated tube of the carrier body 38 may have an oval, circular, triangular, square, pentagonal, or other polygonal-shaped cross section. In some embodiments, the cross section may comprise one or more concave angles or indentions. The carrier body 38 may be made, for example, from a non-conductive material. Examples of suitable non-conductive materials include thermoplastic polymers, such as polyvinyl chloride, polycarbonate, polyoxymethylene (e.g., Delrin® acetal resin, available from Dupont Engineering Polymers). In one embodiment, the carrier body 38 is rigid. In an alternative embodiment, the carrier body 38 is flexible. A carrier body 38 that is flexible may be preferred, in some embodiments, to provide flexibility to the first electrode assembly 28A. For example, the carrier body 38 may be sufficiently flexible to permit coiled storage of the electrode assembly 28A on the survey vessel 16 and elongated deployment of the electrode assembly 28A behind the survey vessel 16. The configuration of the carrier body 38 is not limited to the foregoing as other structures may be suitable. By way of example, carrier body 38 may be in the form of a central elongated support with strut members see FIGS. 10 and 11) extending radially therefrom for supporting the electrically conducting surfaces 40. In alternative embodiments (not shown), the carrier body 38 may be the tow cable 26 itself with the electrically conducting surfaces 40 longitudinally spaced on the tow cable.

As illustrated, a series of electrically conducting surfaces 40 may be longitudinally spaced along the carrier body 38. As will be discussed in more detail below, the electrically conducting surfaces 40 may be electrically coupled in parallel, for example, to the electrical conductor 32 in the tow cable 26 wherein the first electrode assembly 28A may be activated when the charge is applied to the electrically conducting surfaces 40. In present embodiments, the electrically conducting surfaces 40 may be configured to be in contact with water (e.g., body of water 18 on FIG. 1) when the first electrode assembly 28A is deployed in the water in operation. In one embodiment, the electrically conducting surfaces 40 may be disposed around the carrier body 38. In some embodiments, each of the electrically conducting surfaces 40 may be continuous surfaces that are fitted around the carrier body 38. For example, the electrically conducting surfaces 40 may be in the form of metal tubes or rings that are fitted around the carrier body 38. In alternative embodiments, one or more of the electrically conducting surfaces may be discontinuous. For example, one or more of the electrically conducting surfaces 40 may be in the form of a split ring. The electrically conducting surfaces 40 may be made from any of a variety of suitable electrically conducting materials, including carbon fiber, graphite impregnated glass fiber or other fibers, or metal, for example. Examples of suitable metals include 316 alloy stainless steel or copper. In some embodiments, the electrically conducting surfaces 40 may comprise a metal coated with a mixed-metal oxide, such as titanium or titanium-clad copper coated with the mixed-metal oxide.

The electrically conducting surfaces 40 may have a length $L_1$, for example, of about 0.1 meters to about 0.5 meters. In some embodiments, the length $L_1$ of the electrically conducting surfaces 40 should generally be consistent. In alternative embodiments, the length $L_1$ may differ for one or more of the electrically conducting surfaces 40, for example, from one of electrically conducting surfaces 40 to the next. In the illustrated embodiment, there is a gap between each of the electrically conducting surfaces 40 disposed on the carrier body 38. Among other things, this gap should allow the first electrode assembly 28A to flex in embodiments with a flexible carrier body 38. The gap may have a length $L_2$, for example, of about 0.1 meters to about 0.5 meters. In some embodiments, the length of the gap should generally be consistent to ensure that the overall field generated by the first electrode assembly 28A is similar to a single, contiguous metal electrode. In alternative embodiments, the length $L_2$ of the gap may differ for one or more of the electrically conducting surfaces 40, for example, from one of electrically conducting surfaces 40 to the next. In some embodiments, the length $L_2$ of the gap and the length $L_1$ of the conducting surfaces 38 may be substantially the same.

Each of the electrically conducting surfaces 40 may be electrically coupled in parallel to the first electrical conductor 32 by a respective one of the electrical conductors 42 in the first electrode assembly 28A. In one embodiment, the first electrical conductor 32 and the electrical conductors 42 may be insulated. Electrical connection between the first electrical conductor 32 in the tow cable 26 and the electrical conductors 42 in the first electrode assembly 28A may be made by any suitable electrical conductors (not shown) disposed in the respective cable-end terminations, such as the termination plate 34 and forward termination 36.

The first electrode assembly 28A may be terminated at its alt end by an all termination 44. The all termination 44 may make mechanical connection to the spacer cable 30. The spacer cable 30 may include one or more internally disposed, conductors (not shown) configured to make electrical connection to one or more of the second electrical conductors 33 in the tow cable 26 via one or more electrical conductors (not shown) that can extend along the length (e.g., either inside or outside) of the first electrode assembly 28A. In some embodiments, the spacer cable 30 may have electrically insulating material on its exterior surface to cause the first electrode assembly 28A and second electrode assembly 28B, coupled to the at end of the spacer cable 30, to be electrically isolated from each other. The spacer cable 30 may include suitable electrical and mechanical terminations 46 at each axial end thereof to couple to corresponding terminations on the axial ends of the first and second electrode assemblies 28A, 28B. While not illustrated, the spacer cable 30, in some embodiments, may run from the aft end of the tow cable 26 without connection to the aft end of the first electrode assembly 28A, wherein the tow cable 26 includes a twin electrical core cable that splits for connection to the first electrode assembly 28A and the second electrode assembly 28B.

As illustrated, the second electrode assembly 28B may be substantially similar to the first electrode assembly 28A in accordance with embodiments of the present invention. In the illustrated embodiment, the second electrode assembly 28B includes a forward termination 36 for making mechanical and electrical connection to the spacer cable 30 at the aft end of the spacer cable 30. The forward termination 36 may be coupled to a carrier body 38. As illustrated, a series of electrically conducting surfaces 40 may be longitudinally spaced on the carrier body 38. In the present embodiment, electrical connection may be made between the conductors (not shown) in the spacer cable 30 and the electrically conducting surfaces 40 on the second electrode assembly 28B. Ultimately, each of the electrically conducting surfaces 40 may be coupled in parallel to the second electrical conductor 33 in the tow cable 26 by one or more of the electrical conductors 42 in the second electrode assembly 28B. As illustrated, the second electrode assembly 28B may be terminated at its aft end by an aft termination 44. In one embodiment, the all termination 44 of the second electrode assembly 28B may be open, thus allowing entry of water into the interior of the second electrode assembly 28B.

While FIG. 2 illustrates two electrode assemblies 28A and 28B coupled to tow cable 26 it should be understood that embodiments of the present invention may include the tow cable 26 coupled to only one electrode assembly 28 having a carrier body 38 and electrically conducting surfaces 40 longitudinally spaced along the carrier body 38 and electrically coupled in parallel, as shown in FIG. 3. Other types or electrodes for transmitting an electromagnetic field could also be used with the tow cable 26 in accordance with embodiments of the present invention. For example, a conventional electromagnetic source may also be disposed on the tow cable 26 in addition to the electrode assembly 28.

Figure 4:
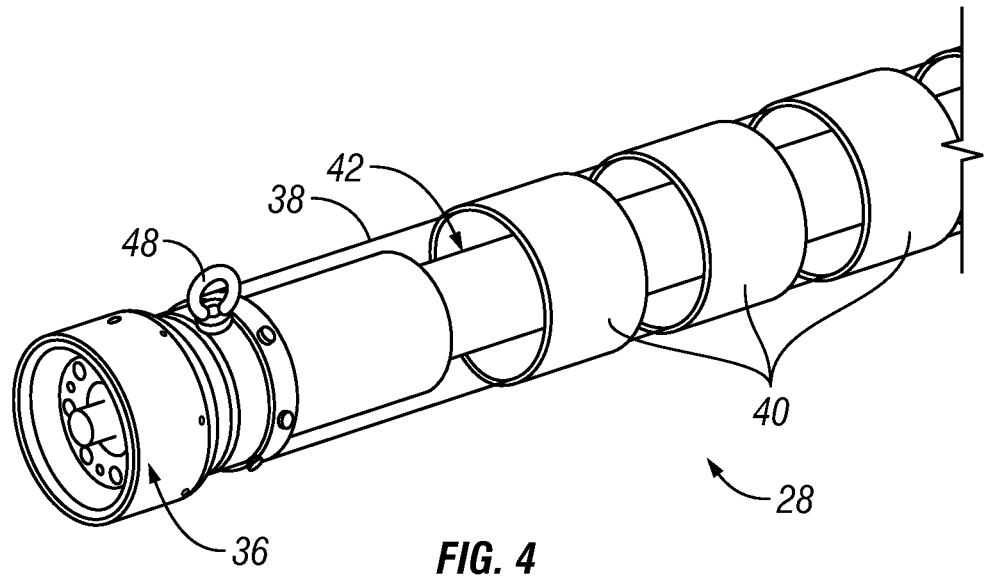
FIG. 4 illustrates a forward end of an electrode assembly in accordance with example embodiments of the present invention.

FIG. 4 shows the forward end of an electrode assembly 28 in accordance with embodiments of the present invention. As illustrated, the electrode assembly 28 includes a forward termination 36, a carrier body 38, and electrically conducting surfaces 40 longitudinally spaced on the carrier body 38. As previously mentioned, each of the electrically conducting surfaces 40 may be electrically coupled in parallel to an electrical conductor (e.g., first electrical conductor 32 on FIGS. 2 and 3) by a respective one of the electrical conductors 42 in the electrode assembly 28. In the illustrated embodiment, the forward termination 36 may be a flange that can be coupled to an end of a corresponding cable, such as the aft termination 34 of tow cable 26 or the termination 46 of the spacer cable 30 shown on FIG. 2, using any suitable coupling such as clamps, a threaded sleeve, or capscrews. The forward termination 36 further may include a connector 48, such as a support ring or collar, for attaching the electrode assembly 28 to floats or other equipment.

Figure 5:
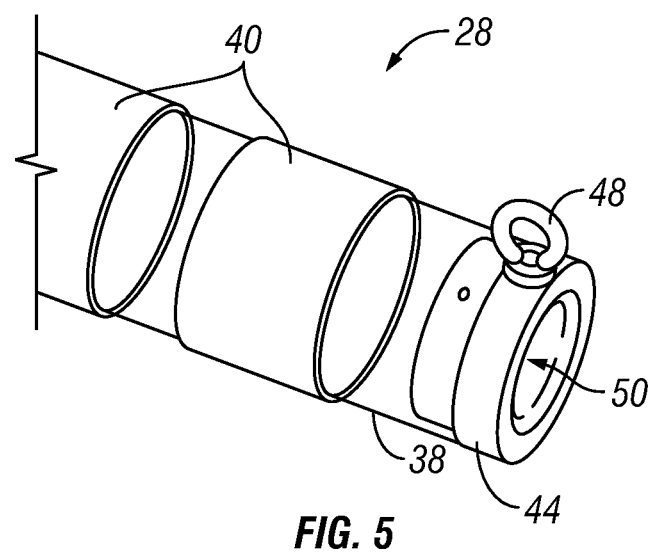
FIG. 5 illustrates an aft end of an electrode assembly in accordance with example embodiments of the present invention.

FIG. 5 shows the aft end of an electrode assembly 28 in accordance with embodiments of the present invention. As illustrated, the electrode assembly 28 includes an aft termination 44, a carrier body 38, and electrically conducting surfaces 40 longitudinally spaced on the carrier body 38. In the illustrated embodiment, the aft termination 44 may have a distal opening 50 that allows, for example, water ingress when the electrode assembly 28 is in operation (e.g., deployed in body of water 18 on FIG. 1). The aft termination 44 further may include a connector 48, such as a support ring or collar, for attaching the electrode assembly 28 to floats or other equipment, such as the forward end of the space cable 30.

Figure 6:
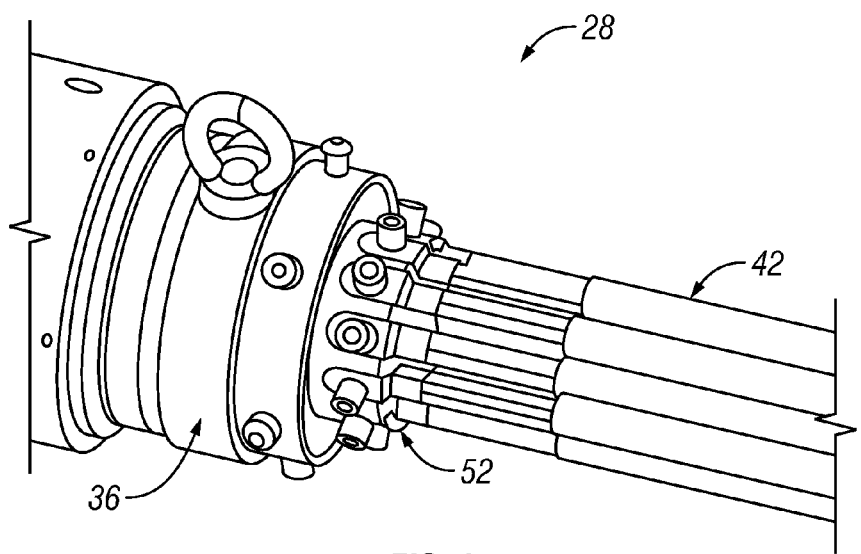
FIG. 6 illustrates termination of electrical conductors at a forward termination of an electrode assembly in accordance with example embodiments of the present invention.

Referring now to FIGS. 6 and 7, termination of the electrical conductors 42 into the forward termination 36 of the electrode assembly 28 is illustrated in accordance with embodiments of the present invention. As best seen by FIG. 7, the electrical conductors 42 connect each of the electrically conducting surfaces 40 to the forward termination 36 to form a parallel connection. For example, each of the electrically conductors 42 may extend from the forward termination 36 to a corresponding one of the electrically conducting surfaces 40. Crimped connectors 52 may be used to connect each of the electrical conductors 42 to the forward termination 36, as shown on FIG. 6. In an alternative embodiment (not shown), welding or other suitable connection may be used for coupling the electrical conductors 42 to the forward termination 36. In some embodiments, the electrical connection at the forward termination 36 may have an overmold (not shown) of an electrically insulating material, such as polyurethane, to prevent water ingress, for example. It should be noted that an overmold may not be needed for the forward termination 36 itself as it can be made from a suitable material, such as titanium or stainless steel.

Figure 8:
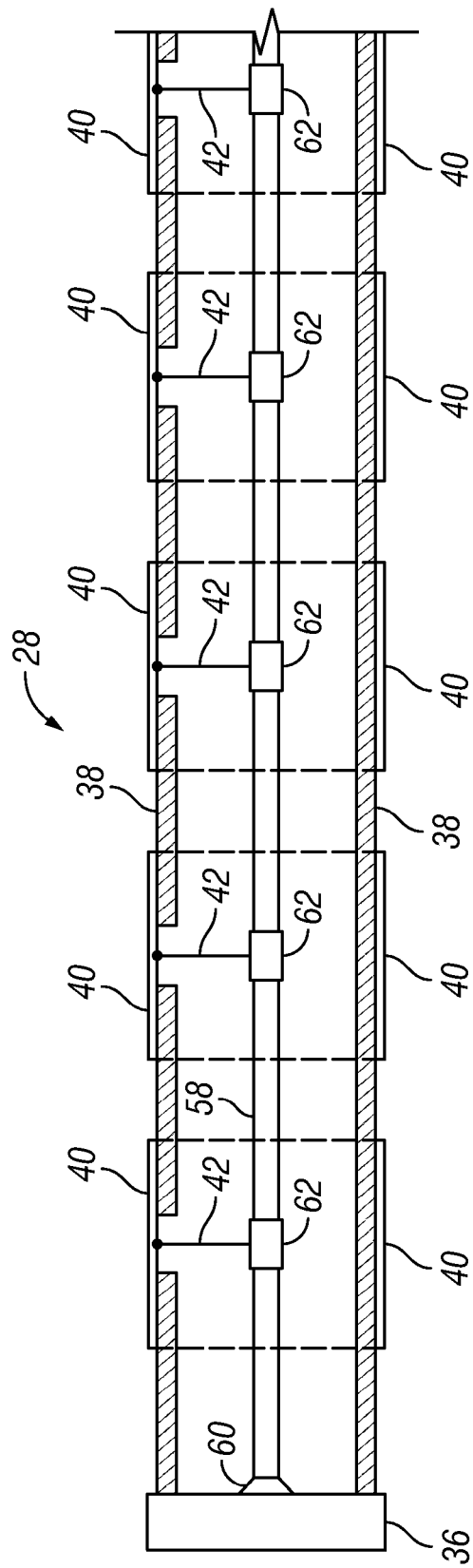
FIG. 8 illustrates an electrode assembly comprising a central core in accordance with embodiments of the present invention.

FIG. 8 shows an electrode assembly 28 having a central core 58 in accordance with embodiments of the present invention. As illustrated, the central core 58 may be inside the carrier body 38. The central core 58 may be electrically coupled to the forward termination 36 at electrical connection 60. The central core 58 may extend along the substantial length of the electrode assembly 28. The central core 58 may include a plurality of electrical terminations 62, which may be waterproof, for example. An electrical conductor 42 may extend from each of the electrically conducting surfaces 40 terminating at a corresponding one of the electrical terminations 62.

Figure 9:
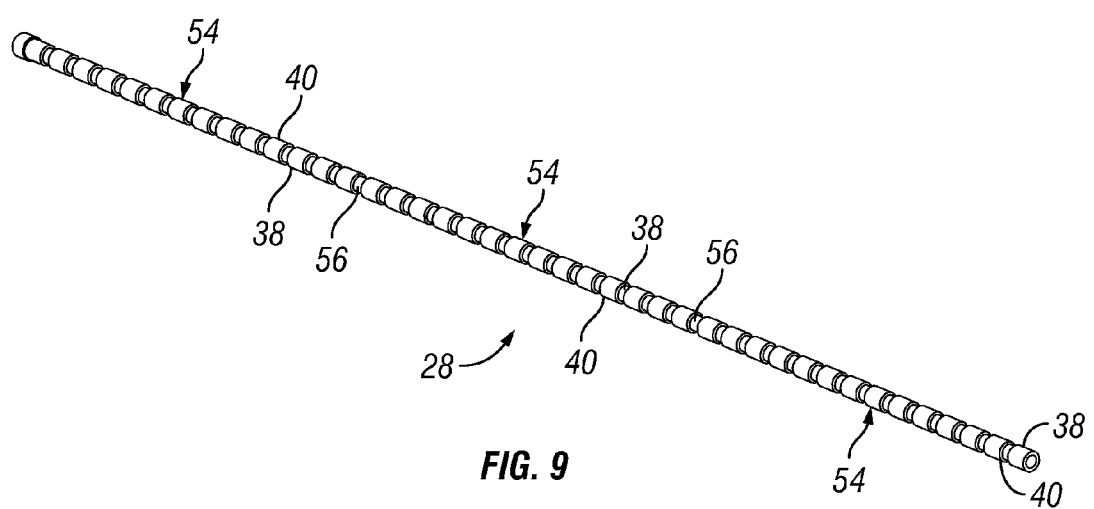
FIG. 9 illustrates an electrode assembly that comprises two or more electrode sections in accordance with example embodiments of the present invention.

FIG. 9 shows an electrode assembly 28 that includes two or more electrode sections 54 in accordance with embodiments of the present invention. Each of the electrode sections 54 may comprise a carrier body 38, and electrically conducting surfaces 40 longitudinally spaced along the carrier body 38. As described above, the electrically conducting surfaces 40 may be electrically coupled in parallel to a source cable (e.g., source cable 24 on FIG. 1). In some embodiments, each of the electrode sections 54 may be individually energized. In some embodiments, each of the electrodes sections 54 may be simultaneously energized.

While FIG. 9 shows three electrode sections 54, it should be understood that embodiments of the present invention may include more or less electrode sections 54 for a particular-implementation of the electrode assembly 28. In one embodiment, a flexible joint 56 may be disposed between adjacent electrode sections 54. The flexible joint 56 may make mechanical and electrical connection between adjacent electrode sections 54. The flexible joint 56 may be configured, for example, to allow the electrode sections 54 to swing with respect to one another. Among other things, the flexible joint 56 may be desirable in embodiments where the carrier body 38 is rigid to provide some flexibility to the electrode assembly 28.

Figure 10:
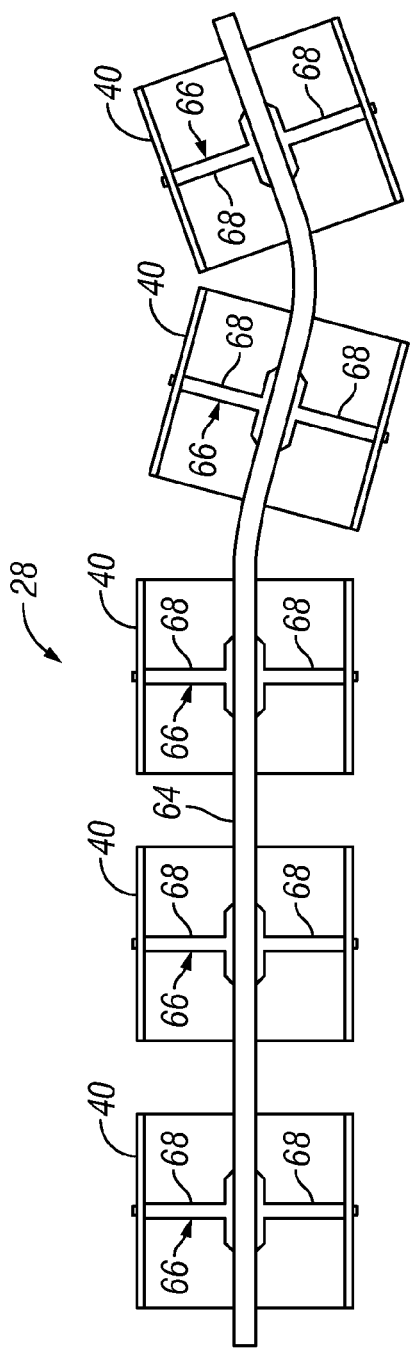
FIGS. 10 and 11 illustrate an electrode assembly in accordance with alternative example embodiments of the present invention.
Figure 11:
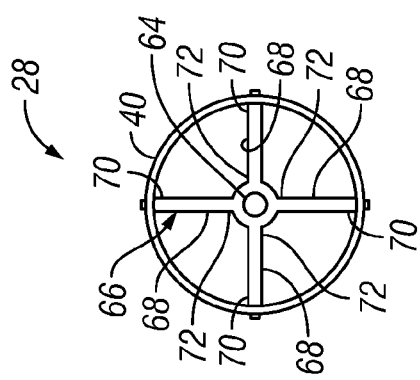

FIGS. 10 and 11 show an electrode assembly 28 in accordance with an alternative embodiment of the present invention. As illustrated, the electrode assembly 28 may comprise a carrier body 38 that includes a central elongated support 64. In some embodiments, the central elongated support 64 may be flexible in accordance with embodiments of the present invention. In alternative embodiments, the central elongated support 64 may be rigid. As illustrated, the carrier body 38 further may include a series of annular elements 66 spaced longitudinally on the central elongated support 64. Each of the annular elements 66 may include a set of strut members 68, which may be interconnected, for example, in a hub-and-spoke configuration. In the illustrated embodiment, four strut members 68 (as seen on FIG. 11) are shown for each annular element 66; however, more or less strut members 68 may be used as appropriate for a particular application. As illustrated, the strut members 68 for each of the annular elements 66 may be circumferentially disposed about the central elongated support 64. Each strut member 68 may extend between the central elongated support 64 and a corresponding one of the electrically conducting surfaces 40. Each strut member 68 may have a first end 70 and a second end 72, as shown by FIG. 11. The first end 70 of each strut member 68 may be coupled to one of the electrically conducting surfaces 40. The second end 72 of each strut member 68 may be coupled to the central elongated support 64.

Figure 12:
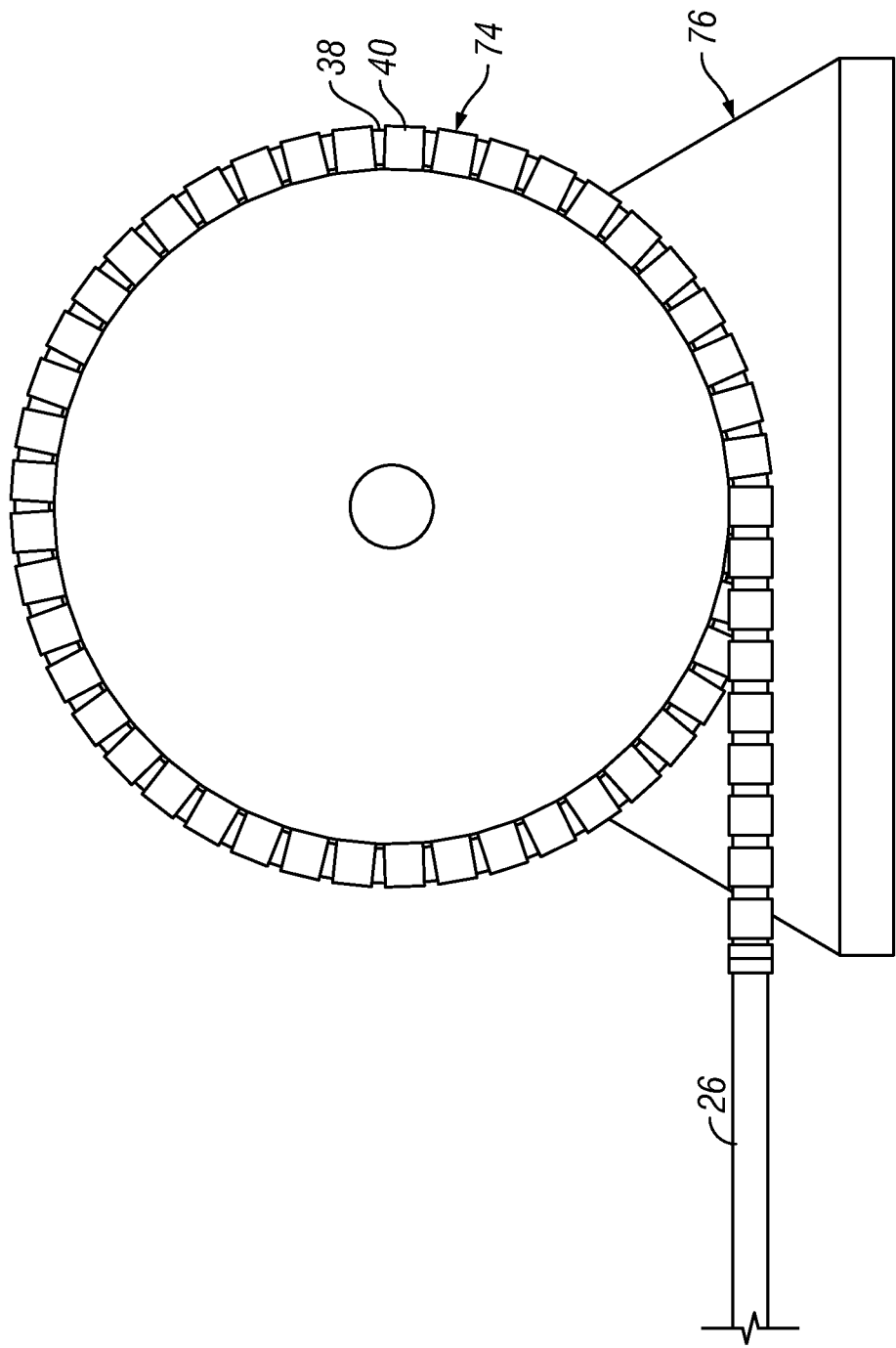
FIG. 12 illustrates a flexible electrode assembly in accordance with example embodiments of the present invention.

FIG. 12 shows a flexible electrode assembly 74 in accordance with yet another alternative embodiment of the present invention. As illustrated, the flexible electrode assembly 74 may comprise a carrier body 38 having electrically conducting surfaces 40 spaced longitudinally on the carrier body 38. As illustrated, the flexible electrode assembly 74 may be coupled to tow cable 26. In the illustrated embodiment, the carrier body 38 is flexible. Accordingly, the flexible electrode assembly 74 may be wound on reel assembly 76 in accordance with present embodiments. The reel assembly 76 may be a winch or other suitable device on which a cable may be wound. Storing and deploying the flexible electrode assembly 74 on the reel assembly 76 may facilitate handling of the flexible electrode assembly 74 aboard the survey vessel 16 (e.g., FIG. 1). For example, the flexible electrode assembly 74 may be deployed from a reel assembly 76 on which the flexible electrode assembly 74 may be disposed.

Some advantages of employing an electrode assembly that includes electrically conducting surfaces that are longitudinally spaced on a carrier body with each of the electrically conducting surfaces electrically coupled in parallel may include one or more of the following. One of the many potential advantages is that by the electrode assembly having a long, thin configuration, in present embodiments, the contact resistance to water may be reduced, as compared to other electrodes with the same surface area. By reducing the resistance to water, lower power requirements may be needed to generate the high levels of current that may be imparted across the electrode assemblies in some embodiments. Lower power requirements may result in reduced system size which in turn results in easier handling and lower cost. Another potential advantage is that use of conducting surfaces that are longitudinally spaced on a carrier body, in present embodiments, may result in lower effective impedance along the length of the electrode assembly resulting in more uniform current density which in turn should lead to less error in the system and a longer life for the electrode assembly. Yet another potential advantage is that by providing a flexible electrode assembly, in present embodiments, the electrode assembly may be easier to store and deploy from the survey vessel. For example, the electrode assembly may be sufficiently flexible in some embodiments to be deployed from a winch. Optionally, flexible electrode assemblies may provide opportunities for better positioning and focusing of an emitted electric field. For example, by using lateral positioning and depth sensors in conjunction with lateral steering and depth control devices along the length of the flexible electrode assembly, a section or end of the electrode assembly may be held at a different depth or lateral position than the remainder of the electrode assembly. In some embodiments, the depth of at least a section of the electrode assembly may be controlled while activating the electrode assembly. In some embodiments, the electrode assembly may be held at a different depth or lateral position than another electrode assembly. Such configurations could be used to emit electric fields comprising selected components in the X, Y, and Z directions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. An electrode assembly, comprising:
a carrier body comprising a central elongated support that is flexible;
a series of annular elements spaced longitudinally on the central elongated support, wherein each of the annular elements comprises strut members and an electrically conducting surfaces, wherein the strut members extend from the central elongated support to the electrically conducting surface; and
a forward termination coupled to the carrier body for making an electrical and mechanical connection to a cable, wherein the forward termination comprises cable-end terminations for electrically coupling the electrically conducting surfaces for each of the annular elements in parallel to an electrical conductor in the cable, the electrical conductor configured to provide a current to the electrically conducting surface for each of the annular elements that energizes the electrode assembly to induce an electromagnetic field.

2. The electrode assembly of claim 1, wherein the carrier body has a cross-section that comprises one or more concave angles or indentions.

3. The electrode assembly of claim 1, wherein the electrode assembly comprises one or more electrode sections, wherein a first electrode sections comprises the carrier body, the series of annular elements and the forward termination, and wherein a second electrode section comprises a second carrier body, a second series of annular elements and a second forward termination.

4. The electrode assembly of claim 1, wherein the electrically conducting surfaces is in the form of a tube or a ring.

5. The electrode assembly of claim 1, wherein the electrically conducting surfaces has a length of about 0.1 meters to about 0.5 meters.

6. The electrode assembly of claim 1, further comprising a central core inside the carrier body, and electrical conductors, the electrical conductors extending from the central core to the electrically conducting surfaces.

7. The electrode assembly of claim 1, wherein the electrical conductors are included in a tow cable.

8. The electrode assembly of claim 1, wherein the electrode assembly has a length of about 10 meters to about 100 meters.

9. The electrode assembly of claim 1, wherein the electrode assembly has a diameter of about 0.1 meters to about 0.3 meters.

10. The electrode assembly of claim 1, wherein the carrier body comprises strut members that extend radially from the central elongated support for supporting the electrically conducting surfaces in a hub and spoke configuration.

11. An electromagnetic survey source cable, comprising:
a tow cable configured to couple the electromagnetic survey source cable to a tow vessel;
a first electrode assembly electrically coupled to the tow cable, wherein the first electrode assembly comprises:
a carrier body comprising a central elongated support that is flexible;
electrically conducting surfaces longitudinally spaced along the carrier body, wherein there is a gap between each of the electrically conducting surfaces; and
a forward termination coupled to the carrier body for making an electrical and mechanical connection to a cable, wherein the forward termination comprises cable-end terminations for electrically coupling the electrically conducting surfaces in parallel to an electrical conductor in the cable;
a second electrode assembly electrically coupled to the tow cable, wherein the second electrode assembly comprises:
a second carrier body comprising a second central elongated support that is flexible;

a second set of electrically conducting surfaces longitudinally spaced along the second carrier body, wherein there is a second gap between each of the second set of electrically conducting surfaces; and a second forward termination coupled to the second carrier body for making an electrical and mechanical connection to the cable, wherein the second forward termination comprises a second set of cable-end terminations for electrically coupling the second set of electrically conducting surfaces in parallel to the electrical conductor in the cable; and a spacer cable disposed between the first carrier body and the second forward termination, wherein the second forward termination is positioned between the spacer cable and the second carrier body.

12. The electromagnetic survey source cable of claim 11, wherein the first carrier body and the second carrier body have cross-sections that comprise one or more concave angles or indentions.

13. The electromagnetic survey source cable of claim 11, wherein the electrode assembly has a length of about 10 meters to about 100 meters.

14. The electromagnetic survey source cable of claim 11, wherein the electrode assembly has a diameter of about 0.1 meters to about 0.3 meters.

15. The electromagnetic survey source cable of claim 13, wherein a distance between the first electrode assembly and the second electrode assembly is in a range of from about 400 meters to about 800 meters.

16. The electromagnetic survey source cable of claim 11, further comprising the tow vessel coupled to the tow cable, the electrical conducting being electrically coupled in parallel to an electrical conductor in the tow cable.

17. The electromagnetic survey source cable of claim 11, wherein the carrier body and the second carrier body comprises strut members that extend radially from the central elongated support and the second central elongated support for supporting the electrically conducting surfaces and the second set of electrically conducting surfaces.

18. An electromagnetic survey source cable, comprising:
    a tow cable configured to couple the electromagnetic survey source cable to a tow vessel;
    a first electrode assembly electrically coupled to the tow cable, wherein the first electrode assembly comprises:
        a carrier body comprising a central elongated support; and
        electrically conducting surfaces longitudinally spaced along the carrier body, wherein there is a gap between each of the electrically conducting surfaces; and
        a forward termination coupled to the carrier body for making an electrical and mechanical connection to a cable, wherein the forward termination comprises cable-end terminations for electrically coupling the electrically conducting surfaces in parallel to an electrical conductor in the cable;
    a second electrode assembly electrically coupled to the tow cable, wherein the second electrode assembly comprises:
        a second carrier body comprising a second central elongated support;
        a second set of electrically conducting surfaces longitudinally spaced along the second carrier body, wherein there is a second gap between each of the second set of electrically conducting surfaces; and
        a second forward termination coupled to the second carrier body for making an electrical and mechanical connection to the cable, wherein the second forward termination comprises a second set of cable-end terminations for electrically coupling the second set of electrically conducting surfaces in parallel to the electrical conductor in the cable; and
    wherein the second forward termination is positioned between the first carrier body and the second carrier body.

19. The electromagnetic survey source cable of claim 18, wherein the first carrier body and the second carrier body have cross-sections that comprise one or more concave angles or indentions.

20. The electromagnetic survey source cable of claim 18, wherein the electrode assembly has a length of about 10 meters to about 100 meters and a diameter of about 0.1 meters to about 0.3 meters.

21. The electromagnetic survey source cable of claim 18, wherein a distance between the first electrode assembly and the second electrode assembly is in a range of from about 400 meters to about 800 meters.

22. The electromagnetic survey source cable of claim 18, wherein the first carrier body and the second carrier body comprises strut members that extend radially from the central elongated support and the second central elongated support for supporting the electrically conducting surfaces and the second set of electrically conducting surfaces.

23. A method of conducting a marine electromagnetic geophysical survey comprising:
    disposing an electromagnetic survey source cable in a body of water, wherein the electromagnetic survey source cable comprises a tow cable configured to couple to a tow vessel and a first electrode assembly electrically coupled to the tow cable, wherein the first electrode assembly comprises a carrier body, a series of annular elements spaced longitudinally on the central elongated support, wherein each of the annular elements comprises strut members and an electrically conducting surfaces, wherein the strut members extend from the central elongated support to the electrically conducting surface and a forward termination coupled to the carrier body for making an electrical and mechanical connection to a cable, wherein the forward termination comprises cable-end terminations for electrically coupling the electrically conducting surface for each of the annular elements in parallel to an electrical conductor in the cable, the electrical conductor configured to provide a current to the electrically conducting surface for each of the annular elements that energizes the electrode assembly to induce an electromagnetic field; wherein the carrier body comprises a central elongated support, wherein there is a gap between each electrically conducting surface; and
    activating the first electrode assembly while each electrically conducting surfaces is electrically coupled in parallel.

24. The method of claim 23, wherein the tow cable further comprises a second electrode assembly, the second electrode assembly comprising a second carrier body and a second set of electrically conducting surfaces spaced longitudinally on the second carrier body, and wherein the method further comprises activating the second electrode assembly while the second set of electrically conducting surfaces of the second electrode assembly are electrically coupled in parallel.

25. The method of claim 23, wherein a distance between the first electrode assembly and the second electrode assembly is in a range of from about 400 meters to about 800 meters.

26. The method of claim 23 further comprising deploying the first electrode assembly from a reel assembly, the first electrode assembly being disposed on the reel assembly.

27. The method of claim 23, further comprising towing a sensor cable behind the survey vessel.

28. The method of claim 23, further comprising measuring an electromagnetic response of formations below a water bottom to one or more electromagnetic fields imparted by the first electrode assembly.

29. The method of claim 23, further comprising controlling the depth of at least a section of the first electrode assembly while activating the first electrode assembly.

30. The method of conducting a marine electromagnetic geophysical survey of claim 23, wherein the carrier body comprises strut members that extend radially from the central elongated support for supporting the electrically conducting surfaces.

* * * * *

UNITED STATES PATENT AND TRADEMARK OFFICE
CERTIFICATE OF CORRECTION

PATENT NO. : 9,720,123 B2  
APPLICATION NO. : 13/494883  
DATED : August 1, 2017  
INVENTOR(S) : James Ewan Mackay et al.

Page 1 of 1

It is certified that error appears in the above-identified patent and that said Letters Patent is hereby corrected as shown below:

In the Claims

In Column 10, Line 1, Claim 1 please delete:
"surfaces"
And replace with:
--surface--

In Column 10, Line 26, Claim 4 please delete:
"surfaces"
And replace with:
--surface--

In Column 10, Line 28, Claim 5 please delete:
"surfaces"
And replace with:
--surface--

In Column 10, Line 33, Claim 6 please delete:
"surfaces"
And replace with:
--surface--

Signed and Sealed this
Twenty-sixth Day of December, 2017

Joseph Matal
*Performing the Functions and Duties of the
Under Secretary of Commerce for Intellectual Property and
Director of the United States Patent and Trademark Office*